United States Patent Office 3,264,339
Patented August 2, 1966

3,264,339
PROCESS FOR THE PREPARATION OF S-(2-HYDROXYALKYL) AND S-(2-MERCAPTOALKYL) ESTERS
Edward A. Swakon, Hammond, Ind., assignor to Standard Oil Company, Chicago, Ill., a corporation of Indiana
No Drawing. Filed May 5, 1964, Ser. No. 365,206
6 Claims. (Cl. 260—455)

This application is a continuation-in-part of application Serial No. 211,119 filed July 19, 1962.

This invention relates to 2-(hydroxyalkyl) and 2-mercaptoalkyl esters and more specifically pertains to S-(2-hydroxyalkyl) and S-(2-mercaptoalkyl) esters of thiolcarbamic acid and a method for preparing these esters.

R. Riemschneider and O. Lorenz, Monatsh., 84, 518–21 (1953), describe the preparation of S-esters of thiolcarbamic acid

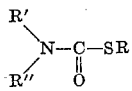

by a two-step reaction involving first reacting phosgene with a mercaptan to form

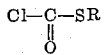

which is then reacted with a primary or secondary amine to obtain the above S-esters of thiolcarbamic acid or monothiolcarbamic acid. Although a number of S-esters of thiolcarbamic acids are disclosed as being prepared by this method, no S-(2-hydroxyalkyl) or S-(2-mercaptoalkyl) esters such as the S-(2-hydroxyethyl) or S-(2-mercaptoethyl) esters are disclosed. If

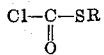

compounds were to be reacted with an amino alcohol, for example ethanol amine; there would be competitive reactions between the amino group an the hydroxyl group providing a mixture of thiolcarbamic and thiocarbonates containing perhaps, primarily the thiocarbonate.

S-alkyl, S-cycloalkyl and S-aryl esters of thiolcarbamic acids have been suggested as being useful additives for lubricants to promote thermal and oxidation stabilization, for active ingredients in insecticidal, fungicidal and bactericidal compositions and for accelerating and/or promoting the vulcanization of rubbery materials because of the presence of the

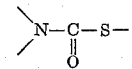

group. To find use as intermediates in chemical reactions, they are dependent on the presence of functional groups as substituents on the N-substituents or on the ester-forming group.

It has now been discovered that S-(2-hydroxyalkyl) and S-(2-mercaptoalkyl) esters of N-substituted monothiolcarbamic acids can be prepared by reacting an olefin oxide or olefin sulfide (i.e., olefin chalcide) with an N-substituted monothiolcarbamic acid which has the formula:

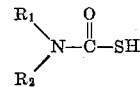

wherein one of $R_1$ and $R_2$ is hydrogen and the other is alkyl; aryl; aralkyl; alicyclic; or heterocyclic oxygen, nitrogen- or sulfur-containing ring groups. When neither $R_1$ or $R_2$ is hydrogen, $R_1$ and $R_2$ can be the same or different alkyl; aryl; aralkyl; alicyclic or heterocyclic oxygen, nitrogen- and sulfur-containing ring groups. Also, $R_1$ and $R_2$ together with the nitrogen to which they are attached can be a heterocyclic group, e.g., pyrryl, pyrrolidyl, pyrazolyl, pyrazolinyl, piperidinyl, imidazolyl, indolyl, beta-methylindolyl, acridinyl, carbazolyl, morpholinyl, and the like groups. N-substituted monothiolcarbamic acid reactants can be provided as their amine salts per se or formed in situ in the presence of the olefin chalcide by reacting carbonyl sulfide with two moles of a primary or secondary amine or one mole each of a primary or secondary amine and one mole of a tertiary amine. The monothiolcarbamic acid reactant can also be formed in situ in the presence of the olefin chalcide by reaction of carbon monoxide with a primary or secondary amine and sulfur.

The reactions involved in the method of this invention may be carried out at any suitable temperature, e.g., in the range of —65 to 300° C. at reaction times up to 24 hours or more. The lower temperatures are associated with the longer reaction periods, and the shorter reaction periods are associated with the higher reaction temperatures. When an olefin oxide is reacted with an N,N-disubstituted monothiolcarbamic acid provided through its amine salt, reaction temperatures as low as —65° C. and reaction pressure of ambient atmospheric pressure can be employed. Where the process of this invention is carried out by first forming the N-substituted monothiolcarbamate salt from CO, S and amine, reaction temperatures of 50° C. and above are employed. Since many of the reactants, especially lower molecular weight amines and olefin chalcides and carbonyl sulfide are quite volatile at the above temperature range and since carbon monoxide is a gas, the reactions are desirably carried out in a closed vessel to prevent loss of the reactants. The reactions also can be carried out at pressures in the range of from 1 to 1000 atmospheres. The use of superatmospheric pressure of from 10 to 1000 atmospheres is especially useful when the carbon monoxide, sulfur, secondary amine and olefin chalcide are reacted or when the stepwise reaction of first reacting carbon monoxide, amine and sulfur is followed by reaction with olefin chalcide.

As employed in the specification and claims "olefin chalcide" means olefin oxide and olefin sulfide, "chalcogen atom having an atomic number of from 8 to 16 inclusive" means oxygen and sulfur, and "chalcohydryl" means hydroxy and mercapto.

From the foregoing description it is abundantly clear that the reaction involved in the method of this invention occurs between the olefin chalcide and the N-substituted monothiolcarbamic acid whether provided by its amine salt or formed in situ as described. It is recognized that N-substituted thiolcarbamic acids are not stable per se, but, nevertheless, the reaction is aptly described as occurring between the olefin chalcide and N-substituted thiolcarbamic acid.

There does not appear to be any limitation on the nature of the $R_1$ and $R_2$ groups of the amine reactant when these groups are not hydrogen or these same groups present in the monothiolcarbamic acid reactant. If the separate $R_1$ and $R_2$ groups or when they are part of a N-heterocyclic ring ($R_1$ and $R_2$ joined in a divalent group to satisfy 2 valences of nitrogen of the thiolcarbamic acid) also contain substituent groups reactive with COS or the olefin oxide, it will be appreciated that compensation for the amount of COS or olefin oxide so consumed is made to obtain the S-(2-chalcohydryl) ester. The group $R_1$ and/or $R_2$ or the aforementioned ring joined $R_1$ and $R_2$ in the N-heterocyclic group containing $R_1$, $R_2$ and the nitrogen of the secondary amine or monothiolcarbamic acid can also contain secondary amino groups in the case of the use of the preparation of monothiolcarbamic acids in situ or in the case where the monothiolcarbamic acid has been prepared from a poly-secondary amine, e.g., $R_1$ and/or $R_2$ is p-methylamino N-phenyl benzylamine, 4,4'-di(methylamino) N-phenyl benzylamine, N-methyl, N'-ethyl ethylene diamine, and the like. $R_1$ and/or $R_2$ can contain a hydroxy group as derived from a di(hydroxyalkyl) amine, a carbalkoxy group as derived from an ester of an amino acid such as methyl pyrrolidine-alpha-acetate, and others.

Suitable as olefin chalcide reactants are those containing at least one

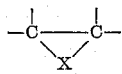

group wherein X is oxygen or sulfur. Illustrative of these olefin oxides and sulfides are those compounds wherein the four valences indicated above are satisfied by hydrogen, alkyl, alicyclic, aryl and alkyl substituted aryl, heterocyclic, etc. groups. It is the epoxy or thio-epoxy group which provides the reactant portion of the olefin chalcide reactant. If there are also present substituent groups which will also react with the monothiolcarbamic acid, or CO, or S, or the secondary amine, the amount of reactants need only be adjusted to compensate for these side reactions. In such a case, the S-(2-chalcohydryalkyl)esters will be formed and the resulting product may be quite complex. Typical olefin chalcide reactants include ethylene oxide, ethylene sulfide, propylene oxide, propylene sulfide, 2,3-epoxy butane, 2,3-butene sulfide, styrene oxide, styrene sulfide, 4-methyl styrene oxide, 4-methyl styrene sulfide, octylene oxides, octylene sulfides, cyclohexene oxide, cyclohexene sulfide, vinyl cyclohexene dioxide, dipentene dioxide, dicyclopentadiene dioxide, among others.

As amine percursors of the monothiolcarbamates in addition to those hereinbefore indicated, there may be used ethylamine, diethylamine, propyl amine, dipropylamines, butylamines, dibutylamines, pentylamines, diamylamines, cyclohexylamines, dicyclohexylamine, di-(methycyclohexyl) amine, aniline, diphenylamine, benzylamine, dibenzylamine, N-methyl N-phenylamine, N-methyl N-cyclohexylamine, and others of the classes hereinbefore defined. The formation of N-substituted thiolcarbamic acids or their amine salts by the reaction of carbonyl sulfide or carbon monoxide and sulfur with the amine is not per se a part of this invention but rather belongs to the prior art.

The process of this invention may be illustrated by the following specific examples.

*Example 1*

COS is bubbled into dibutylamine (65 grams, 0.5 mole) until 15 grams (0.25 mole) are absorbed. The resulting solution of dibutylammonium monothiol dibutylcarbamate is transferred to a 300 ml. stainless steel reactor. Propylene oxide (15 grams, 0.25 mole) is added. The reaction is heated slowly to 200° C. over a three-hour period. 90 grams of dark amber liquid is obtained. Seventy-six grams of this material are distilled as follows:

| Cut | Temperature | | Pres., mm./Hg | Amount, g. | Comment |
|---|---|---|---|---|---|
| | Pot | Overhead | | | |
| 1 | 25-120 | 25-35 | 0.3 | 19.59 | Mostly dibutylamine. |
| 2 | 125-153 | 55-57 | 0.4 | 3.22 | Mostly 2-dibutylaminopropanol. |
| 3 | 168-172 | 130-136 | 0.5 | 16.20 | Product. |
| 4 | 165-171 | 135-145 | 1.1 | 16.60 | Do. |
| 5 | 171-186 | 146 | 1.1 | 12.18 | Do. |

Cut 2 has the same boiling point and gas chromatography retention time as 2-dibutylaminopropanol prepared from dibutylamine and propylene oxide.

The infra-red spectra of Cuts 3, 4 and 5 are identical and have an absorption band at 2.9 microns for the hydroxyl group and an absorption band at 6.1 microns for the thiocarbamate group. This material is assigned the following structure:

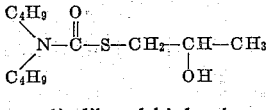

S-(2-hydroxylpropyl)-dibutylthiolcarbamate (86 mole percent conversion).

*Example 2*

A 300 ml. stainless steel reactor is charged with 65 grams dibutylamine, 10 grams sulfur, 15 grams propylene oxide and 600 p.s.i. carbon monoxide and heated over a three-hour period until temperature reaches 248° C. After cooling to room temperature, 95 grams of dark liquid is obtained which evolves a gas. 56 grams of this material is distilled under reduced pressure. The following cuts were obtained:

| Cut | Temperature, ° C. | | Grams Collected | Comment |
|---|---|---|---|---|
| | Pot | Overhead | | |
| 1 | 25-92 | 28-53/10 mm. | 22.7 | Mostly n-butylamine. |
| 2 | 92-140 | 55-66/0.6-2.5 mm. | 13.04 | Mostl 2-dibutylamine propanol. |
| 3 | 154-165 | 120-123/0.7 | 12.63 | Mostly product. |
| 4 | 165-190 | 133-134/0.6 | 5.95 | Do. |

Cut 2 boiling at 56-66/0.6-2.5 mm. is mostly 2-dibutylaminopropanol and gives identical retention time on gas chromatography with 2-dibutylaminopropanol prepared from dibutylamine and propylene oxide. The infra-red spectra of Cuts 3 and 4 are identical and have an absorption band at 3.0 microns for the hydroxyl group and a band at 6.1-6.2 microns for the thiolcarbamate group. This material is assigned the following structure:

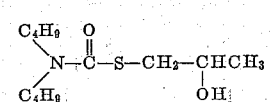

S-(2-hydroxylpropyl)-dibutylthiolcarbamate

*Example 3*

Carbonyl sulfide is bubbled into a mixture of 65 grams di-n-butylamine (0.5 mole) and 135 grams triethylamine until 40 grams (.66 mole) is absorbed. This solution is divided into two portions. To one-half of solution at 10° C. is added 15 grams ethylene oxide. This solution is transferred to a 300 ml. stainless steel pressure reactor and heated to 52° C. for four hours. Maximum pressure developed is 110 p.s.i.g. 123 grams of grey opaque liquid is recovered. Low boiling materials are stripped by heating the product on steam bath. 57.68 grams of this material were distilled and the following fractions collected:

| Cut | Boiling Range, ° C./mm. Hg | Grams Collected |
|---|---|---|
| 1 | Condensate in Dry Ice trap | 20 |
| 2 | 24-44/0.9 | 3.6 |
| 3 | 74-88/0.6 | 1.11 |
| 4 | 110-136/0.4 | 15.74 |
| 5 | 130/0.4 | 2.55 |
| Bottoms | | 10.57 |

Infra-red spectra of Cuts 4 and 5 were alike and had an absorption band at 2.9 mμ for the OH group and one at 6.1-6.2 mμ for the thiocarbamate group. The following structure was assigned:

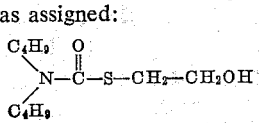

Example 4

To the other half of the triethylammonium monothiodibutylcarbamate described in Example 3 was added 40 grams of styrene oxide and the solution transferred to a 300 ml. stainless steel pressure reactor. Reaction mixture was rocked and heated at 52° C. for four hours. Maximum pressure reached was 110 p.s.i.g. 153 grams of amber liquid were recovered. 70.84 grams of this material were distilled and bulk of the material distilled with difficulty at 193° C./1.6 mm. Infra-red spectrum on this fraction showed an absorption band at 2.95 m$\mu$ for the hydroxyl group and one at 6.1–6.2 m$\mu$ for the carbonyl group. The following structure was assigned:

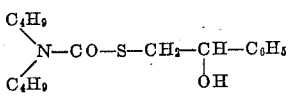

Elemental analysis is in fair agreement:
Found: C, 67.69; H, 8.74; N, 4.09; S, 10.2.
Calculated for $C_{17}H_{27}O_2NS$: C, 66.1; H, 8.84; N, 4.55; S, 10.35.

Example 5

52 grams of COS were added to a solution of 130 grams dibutylamine and 202 grams triethylamine in a 3-neck flask with stirring. 45 grams of ethylene oxide were bubbled into this solution. The reaction was mildly exothermic and the temperature was controlled by placing the flask in cold water. After about an hour, the product was distilled. During distillation, a white waxy solid formed and 23 grams of light tan waxy solid were recovered as bottoms. This material is believed to be polyethylene sulfide. 65 grams of S-2-hydroxyethyl-N,N-dibutylthiocarbamate were obtained which distilled at 133° C./0.5 mm. 10 grams of 2-hydroxyethyl dibutylamine were obtained which distilled at 128–140° C./1.5 mm. Infra-red spectrum was also in agreement with the structure for the product.

Example 6

Eleven grams of COS were added to a mixture of 32.5 grams dibutylamine and 50 grams pyridine in a 3-neck flask with stirring. Fifteen grams of ethylene oxide were then added. After an hour, the product was distilled. Thirty grams of product, 2-hydroxyethyl carbamate of dibutylamine were obtained which distilled at 145–151° C./0.7–1.1 mm. The waxy solid observed in Example 5 did not occur and its formation may be associated with the base solvent.

Example 7

A cooled mixture of 14 grams of di-n-butylamine, 80 ml. of anhydrous ether and 6 grams of carbonyl sulfide is placed in a 300 ml. stainless steel pressure vessel which is cooled in a Dry Ice bath. To this mixture is added 6.4 grams of ethylene sulfide, and the vessel is sealed. An additional 5 ml. of carbonyl sulfide is added by means of a pump and the resulting mixture is agitated on a rocker for two hours and left standing overnight. The excess gas is then vented and the vessel is opened. The content is transferred to a beaker and the solvent is removed over a steam bath. The residue is distilled and the fraction boiling at 135–140°/0.8 mm. collected. This residue has a refractive index of $n_D^{20.3}$ 1.5120. A yield of 19 grams of S-(2-mercaptoethyl) N,N-dibutylthiolcarbamate is obtained.

The infra-red spectrum of this compound shows a weak mercapto band at 3.95$\mu$ and a strong carbonyl band at 6.1$\mu$.

Example 8

A cooled mixture of 7 grams of n-propylamine, 5 grams of carbonyl sulfide and 70 ml. of absolute methanol is placed in a 300 ml. stainless steel vessel which is cooled with solid $CO_2$. Seven grams of ethylene sulfide is then added and the vessel is sealed. An additional 10 ml. of carbonyl sulfide is added by means of a pump and the resulting mixture is agitated on the rocker for 4 hours exposed to air at ambient temperature, room temperature 25 to 20° C., and left standing overnight. The excess gas is then vented and the vessel is opened. The reaction mixture is diluted with 600 ml. of water and extracted with 300 ml. of ether in two portions. The etherial extracts are combined and washed with water, dried over anhydrous sodium sulfate, filtered and the solvent is removed over a steam bath. The residue is distilled and the fraction boiling at 120–123°/.6 mm. is collected. The product was a semi-solid at room temperature. This product is S-(2-mercaptoethyl) N-(n-propyl) thiolcarbamate.

The infra-red spectrum of this compound shows a strong band at 3.0$\mu$ (NH), a weak band at 3.95$\mu$ (SH) and a strong band at 6.1$\mu$.

The reaction between n-propylamine salt of N-(n-propyl) monothiolcarbamic acid and ethylene sulfide cooled with solid $CO_2$ (−65 to −60° C.) undoubtedly took place at a temperature well below 10° C. and before the expiration of the 4 hours of agitation by rocking. For the same reactants combined at 20 to 25° C. and maintained at 20° C. by cooling produce sym. di-(n-propyl) urea and $\beta$-mercapto ethyl mercaptan.

What is claimed is:

1. A method of preparing S-(2-mercaptoalkyl) esters of a N,N-disubstituted monothiolcarbamic acid which comprises reacting an olefin sulfide with a N,N-disubstituted monothiolcarbamic acid wherein said ester and said acid the substituents on the respective nitrogens are hydrocarbon substituents.

2. A method of preparing S-(2-hydroxypropyl)-dibutylthiolcarbamate which comprises reacting at a temperature in the range of −65 to 300° C. N,N-dibutylthiolcarbamic acid with propylene oxide.

3. A method of preparing S-(2-hydroxyethyl)-dibutylthiolcarbamate which comprises reacting at a temperature in the range of −65 to 300° C. ethylene oxide with N,N-dibutylthiolcarbamic acid with ethylene oxide.

4. A method of preparing S-(2-hydroxy-2-phenethyl) N,N-dibutylthiolcarbamate which comprises reacting at a temperature in the range of −65 to 300° C. styrene oxide with N,N-dibutylthiolcarbamic acid.

5. A method of preparing S-(2-mercaptoethyl)-N,N-dibutylthiolcarbamate which comprises reacting at a temperature in the range of −65 to 300° C. ethylene sulfide with N,N-dibutylthiolcarbamic acid.

6. A method of preparing S-(2-mercaptoethyl)-N-(n-propyl)-thiolcarbamate which comprises reacting at a temperature in the range of −65 to 300° C. ethylene sulfide with N-(n-propyl)-thiolcarbamic acid.

References Cited by the Examiner

UNITED STATES PATENTS

| | | | |
|---|---|---|---|
| 3,028,417 | 4/1962 | Eisenmann | 269—455 X |
| 3,126,406 | 3/1964 | Tilles et al. | 260—455 |
| 3,167,571 | 1/1965 | D'Amico et al. | 260—455 |

CHARLES B. PARKER, *Primary Examiner.*

DALE R. MAHANAND, *Assistant Examiner.*